July 14, 1931.   S. B. WELLER   1,814,988
GEAR
Filed Jan. 31, 1930
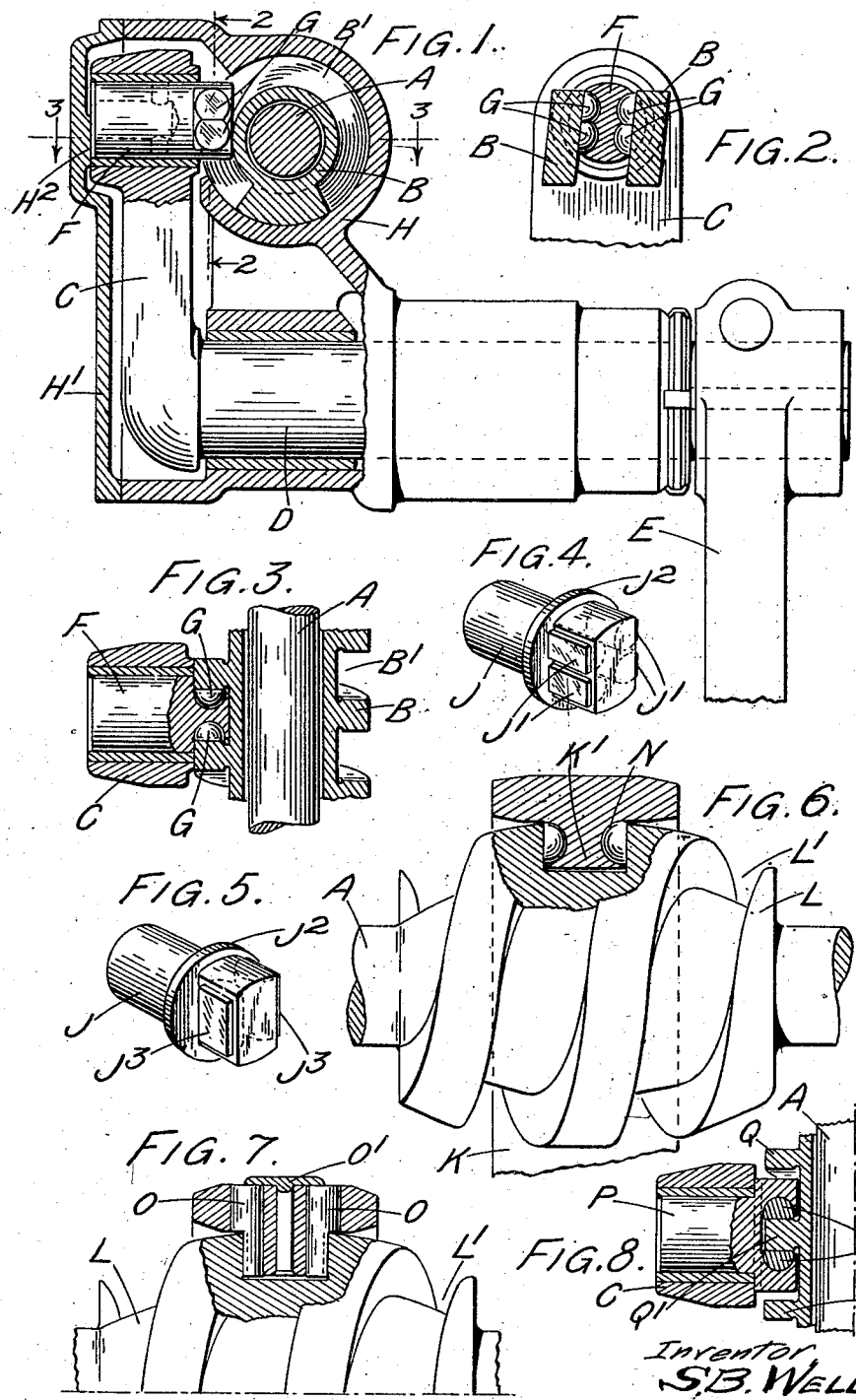
Inventor
S. B. WELLER,
Per,
Blair + Kilsyne
Atty.

Patented July 14, 1931

1,814,988

UNITED STATES PATENT OFFICE

SEPTIMUS BERESFORD WELLER, OF SURBITON, ENGLAND

GEAR

Application filed January 31, 1930, Serial No. 424,971, and in Great Britain February 26, 1929.

This invention relates to gears and refers more particularly to those of the type in which a shaft or column, such as the column of a steering gear for vehicles, is provided with a helical thread which is engaged by a projection or "follower" operatively connected to the member to be moved, such for example as the deflectable axle of a vehicle.

The object of this invention is to provide means whereby a substantial area of flat surface of the follower can be maintained in contact with the sides of the thread.

According to this invention the follower comprises a projection or block whose bearing surfaces which are in contact with the lateral surfaces of the screwthread are constituted by separately formed hardened members each of which has a part cut away to form a flat bearing face, while the back of the member is curved and is freely movable in a correspondingly shaped recess in the block, each such member being thus movable within its recess to allow the flattened face to adjust itself along the side of the groove.

Each hardened bearing member may be formed as a ball carried in a cup-shaped recess in the block the exposed part of the ball being cut away to form a flat bearing face. Alternatively each hardened bearing member may be in the form of a cylindrical pin with a flat cut along the whole or part of one side, the pin being carried in a correspondingly curved groove in the block.

In the accompanying drawings,

Figure 1 is a general view of a steering gear arranged according to this invention, part being shown in section in a plane at right angles to the axis of the steering column, Figure 2 is a section on the line 2—2 of Figure 1, Figure 3 is a detail section on the line 3—3 of Figure 1, Figures 4 and 5 show two modifications of a part of the gear, and Figures 6, 7 and 8 show three alternative constructions.

Referring to Figures 1 to 3, the steering column A is provided with a cylindrical drum B having a helical groove $B^1$ of substantially square cross-section cut therein, the drum B being keyed to the lower end of the steering column A so as to be coaxial and rotate therewith. A lever C is formed integral with a rocker shaft D operatively connected to the front wheels of the vehicle through a crank E, the upper end of the lever C carrying a follower block F adapted to lie within the groove $B^1$. The follower block F is freely movable within the supporting lever C.

The opposite faces of the block F adjacent to the side of the groove $B^1$ each have formed in them two cup-like recesses containing a half ball G which is freely movable therein. The rounded portion of each ball can thus move within its recess while its flattened surface makes a rubbing contact with the adjacent side of the groove $B^1$.

If desired the flattened surface of each of the hardened members may be such as to conform to the adjacent groove side. In such cases means are preferably provided to prevent each hardened member from rotating in a way which will cause its wearing surface to disconform with the groove side, although the hardened members can move for self-adjustment. To this end in the construction illustrated in Figures 1, 2 and 3 the cup-like recesses are so arranged that the two half balls on each side of the block F when in position are in contact with each other, each ball being slightly flattened at the contacting part.

Thus, in the event of axial distortion of the groove variation in the helix angle or in the angle which the side of the groove makes with its base, either or both balls in each side will roll within their respective recesses to allow a maximum of their flat surfaces to remain in engagement with the sides of the groove, the flattened surface engagement between each pair of balls serving to prevent any individual ball from rotating into a position in which its groove engaging surface disconforms with the adjacent groove side.

The gear is enclosed in a casing H having a removable cover plate $H^1$ enabling the block F and the bearing members G to be withdrawn for inspection or renewal. As will readily be seen the construction and arrangements of the parts are such that end thrust on the block F will be small but for the purpose of receiving any such thrust the cover plate H¹ is provided with an internal projection H² which bears against the back of the block F.

Figure 4 illustrates a modified form of follower block in which the block J has two channels on each of its faces which are adjacent to the walls of the groove B¹. Each channel supports a substantially semi-cylindrical pin J¹ of segmental cross-section the flattened portion of which constitutes the bearing surface to engage the adjacent side of the groove. With this construction the lateral thrust on the block J is taken by a flange J² which engages the upper end of the arm C, and if the block is to be withdrawn the rocker shaft D is also removed.

Figure 5 shows a further modification in which semi-cylindrical pins J³ are arranged with their longitudinal axes at right angles to the length of the shaft A.

Figure 6 is a diagrammatic representation of the invention as applied to a drum of the barrel type and with this arrangement an arm K (corresponding to the arm C in Figure 1) is bent over so that its upper end lies over the top of a barrel-shaped drum L which is keyed to the steering column A. The arm K has a projection or block K¹ which is adapted to lie within a helical groove L¹ of approximately square cross-section cut in the drum L. Two half balls N lie in cup-shaped recesses provided in each side of the projection K¹, the arrangement of these parts being similar to that shown in Figures 1 to 3.

Figure 7 shows a construction which differs from that last described in that pins O are employed instead of the half balls N. The pins O are cylindrical at their upper ends but are of semi-cylindrical or segmental cross-section at their lower ends, the flattened surfaces engaging the adjacent sides of the groove L¹. The pins O are freely movable within the block and can be inserted from above, a large headed stud O¹ serving to prevent their unintentional removal. In both the constructions illustrated in Figures 6 and 7 the blocks carrying the bearing members may be movably mounted on the lever while the flattened surface of each hardened bearing member may be such as to conform to the surface of the groove side. Further, the lower face of the block may be slightly concave to conform to the bottom of the groove L¹.

Figure 8 illustrates a construction in which a grooved block is used in conjunction with a raised thread on the shaft or barrel. The block P (generally similar to the block J in Figure 4) is U-shaped so as to embrace the raised thread Q¹ of a drum Q secured to the steering column A. Each face of the grooved portion of the block P adjacent to the thread Q¹ has a channel within which lies a semi-cylindrical pin R (similar to those shown in Figure 5) the flattened surface of which engages the adjacent surface of the thread Q¹.

It will be appreciated that the constructions above described are given by way of example only and that various modifications may be effected without departing from the spirit of the invention. For example, any desired number of bearing members may be arranged to cooperate with each face of the block and a combined arrangement may be employed as by providing each side of the follower block with both the pin type of bearing member and the ball type. Further, the arrangements as described for one type of cam or drum are not confined thereto but may be modified to cooperate with other grooved or threaded members, such for example as those of the hour glass type, while the groove with which the follower is to cooperate may be of any suitable cross-section.

What I claim as my invention and desire to secure by Letters Patent is:—

1. In a gear of the kind which includes a follower engaging a screwthreaded shaft, the combination of a screwthreaded shaft, a follower block engaging the thread and having curved recesses in those surfaces adjacent to the sides of the thread, a bearing member freely mounted in each recess and having a flattened part which bears against the adjacent side of the thread, and a connection between the block and the member to be moved thereby.

2. In a gear of the kind which includes a follower engaging a screwthreaded shaft, the combination of a screwthreaded shaft, a follower block engaging the thread and having cup-shaped recesses in those surfaces adjacent to the sides of the thread, a hardened bearing member freely mounted in each recess having a spherical surface to engage the cupped recess and also a flattened part which bears against the adjacent side of the thread, and a connection between the block and the member to be moved thereby.

3. In a gear of the kind which includes a follower block engaging a screwthreaded shaft the combination of a screwthreaded shaft, a substantially cylindrical follower block engaging the thread, said block having flattened surfaces on those sides adjacent to the sides of the thread and curved recesses in each flattened surface, a hardened bearing member freely mounted in each recess and having a flattened part which bears against the adjacent side of the thread, a support in which the block is free to rotate and a connection between the support and the member to be moved by the block.

4. In a gear of the kind which includes a follower block engaging a screwthreaded shaft the combination of a screwthreaded shaft, a substantially cylindrical follower block engaging the thread having flattened surfaces on those sides adjacent to the sides of the thread and cup-shaped recesses in each flattened surface, a hardened spherical bearing member freely mounted in each recess, said spherical member having a flattened part which bears against the adjacent side of the thread, a support for the block in which the cylindrical portion of the block is free to rotate and a connection between the support and the member to be moved by the block.

5. In a gear of the kind which includes a follower engaging a screwthreaded shaft, the combination of a screwthreaded shaft, a follower block engaging the thread and having at least two curved recesses in each of those surfaces adjacent to the sides of the thread, a hardened bearing member freely mounted in each recess having a curved surface to engage the recess and also a flattened part which bears against the adjacent side of the thread, means to prevent the individual bearing members from moving independently in such a way that their plane surfaces do not conform to the sides of the screwthread and a connection between the block and the member to be moved thereby.

6. In a gear of the kind which includes a follower engaging a screwthreaded shaft, the combination of a screw-threaded shaft, a follower block engaging the thread and having at least two cupped recesses in each of those surfaces adjacent to the thread, a hardened spherical bearing member freely mounted in each recess and having a flattened part which bears against the adjacent side of the thread, said bearing members being so shaped and interengaging that their flattened surfaces are constrained always to conform to the sides of the thread, and a connection between the block and the member to be moved thereby.

7. For use with a gear of the kind specified, a follower block adapted to engage a screwthreaded shaft, said block having curved recesses in those sides adjacent to the sides of the thread and bearing members freely mounted in said recesses, each bearing member having a flattened part adapted to bear against the adjacent side of the thread.

8. For use with a gear of the kind specified a substantially cylindrical follower block adapted to engage a screwthreaded shaft, said block having flattened surfaces on those of its sides which are adjacent to the sides of the thread and cup-shaped recesses in the flattened surfaces and hardened spherical bearing members each engaging a recess and having a flattened part adapted to bear against the adjacent side of the thread.

9. For use with a gear of the kind specified a follower block adapted to engage a screwthreaded shaft, said block having flattened surfaces on those of its sides which are adjacent to the sides of the thread and at least two cup-shaped recesses in each of the flattened surfaces, a hardened spherical bearing member engaging each recess and having a flattened part adapted to bear against the adjacent side of the thread, said bearing members being so shaped and interengaging that their flattened surfaces are constrained always to conform to the sides of the thread.

In testimony whereof I have signed my name to this specification.

SEPTIMUS BERESFORD WELLER.